Jan. 26, 1954  H. H. WHEELER  2,667,173
CIGAR MACHINE
Filed Nov. 26, 1946  10 Sheets-Sheet 1

INVENTOR
HENRY H. WHEELER
BY Joseph Shea
ATTORNEY

Jan. 26, 1954 H. H. WHEELER 2,667,173
CIGAR MACHINE
Filed Nov. 26, 1946 10 Sheets-Sheet 2
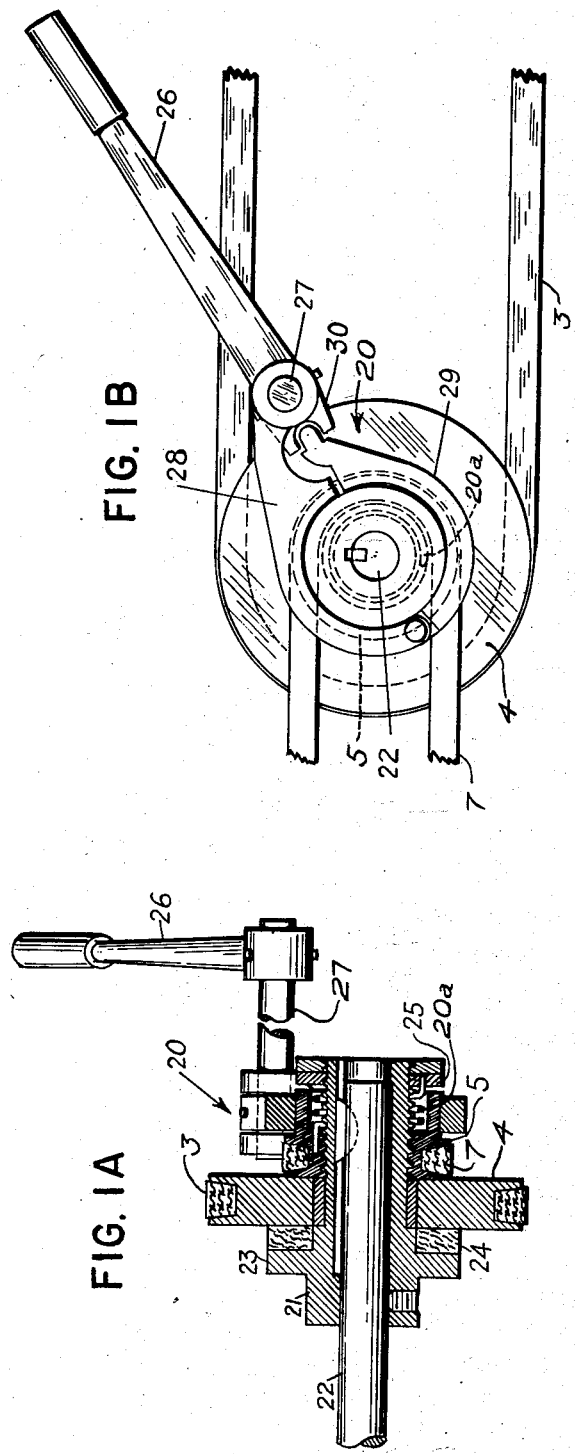
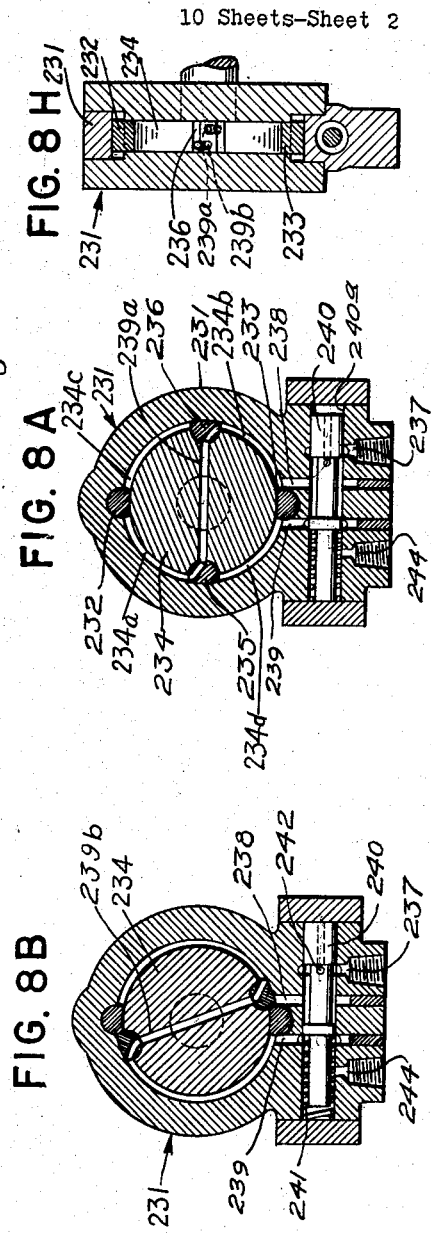
INVENTOR
HENRY H. WHEELER
BY Joseph Shea
ATTORNEY INVENTOR
HENRY H. WHEELER
BY Joseph Shea
ATTORNEY Jan. 26, 1954

H. H. WHEELER 2,667,173

CIGAR MACHINE

Filed Nov. 26, 1946

INVENTOR
HENRY H. WHEELER
BY Joseph Shea
ATTORNEY

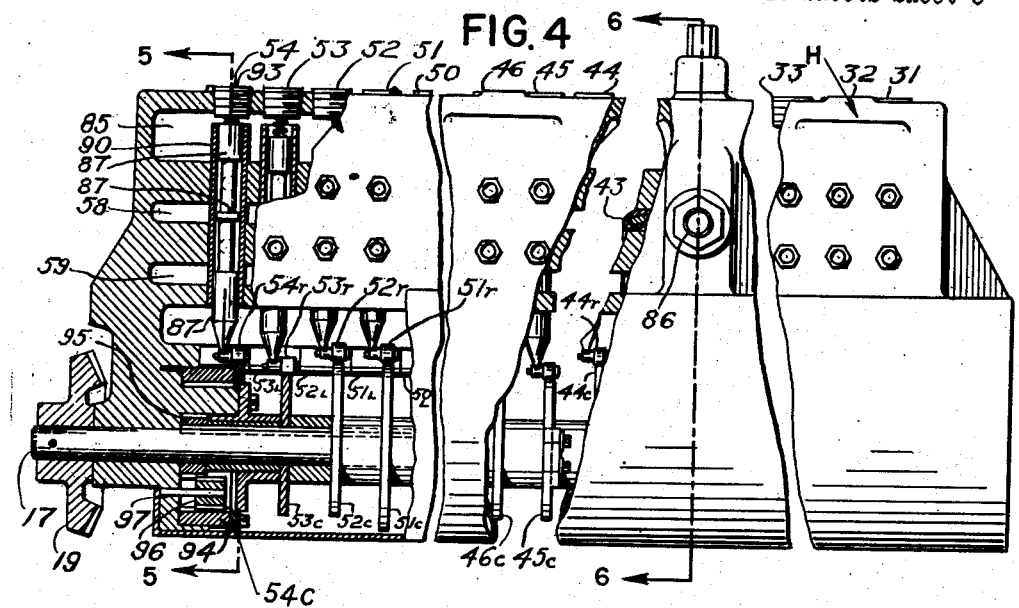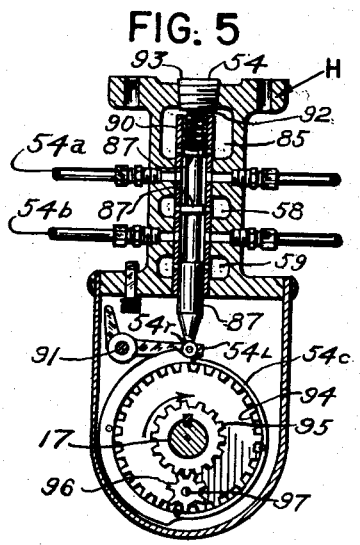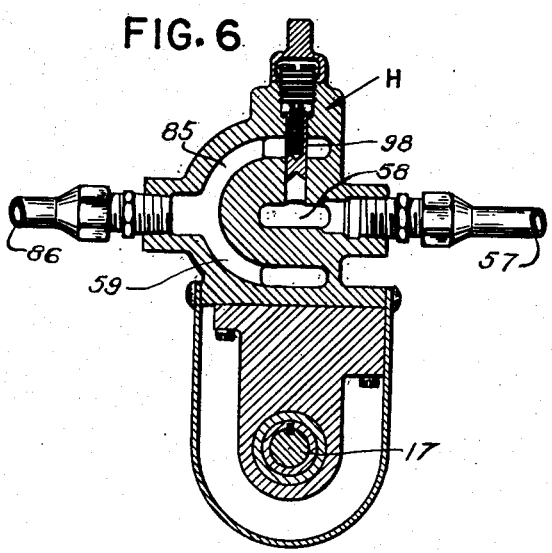

INVENTOR
HENRY H. WHEELER
BY Joseph Shea
ATTORNEY

Jan. 26, 1954
H. H. WHEELER
2,667,173
CIGAR MACHINE
Filed Nov. 26, 1946
10 Sheets-Sheet 8
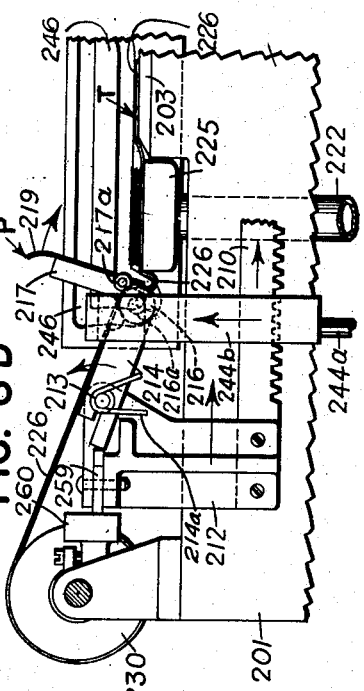
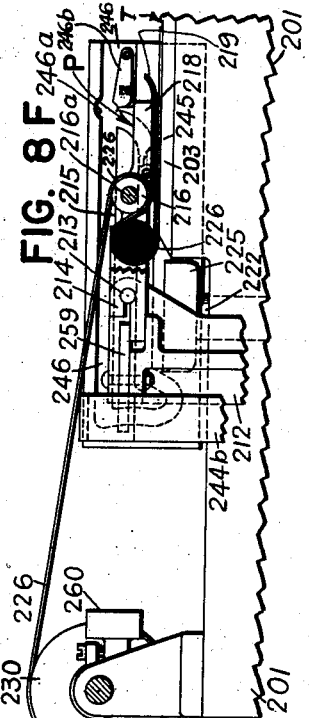
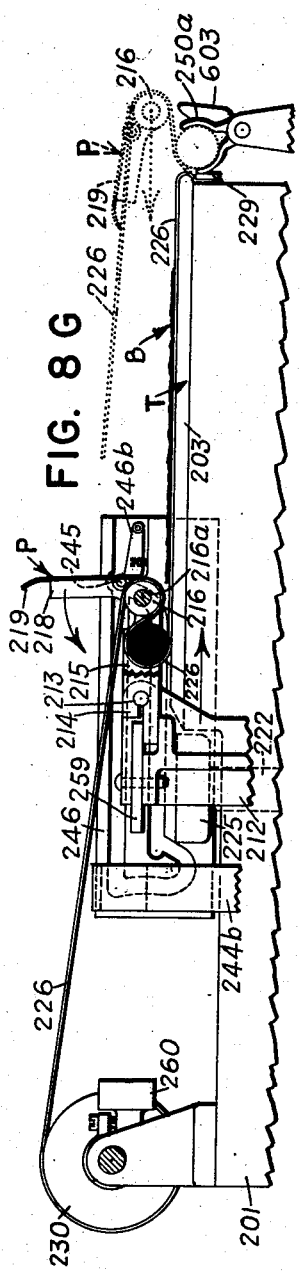
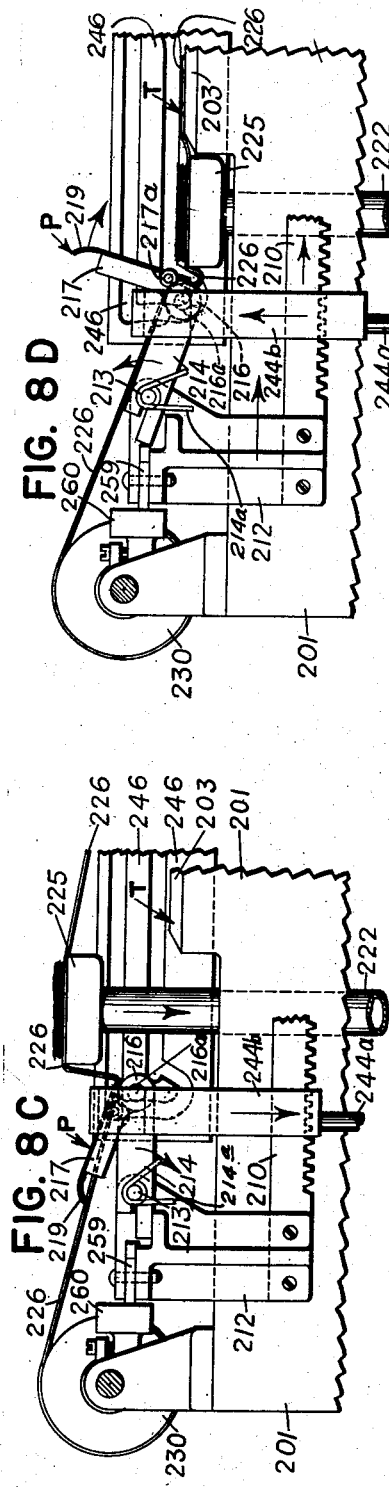
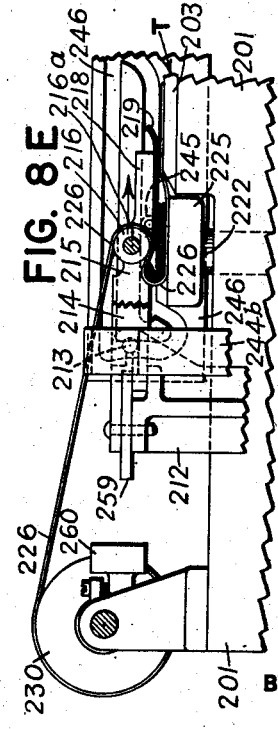
INVENTOR
HENRY H. WHEELER
BY Joseph Shea
ATTORNEY Jan. 26, 1954     H. H. WHEELER     2,667,173
CIGAR MACHINE
Filed Nov. 26, 1946     10 Sheets-Sheet 9
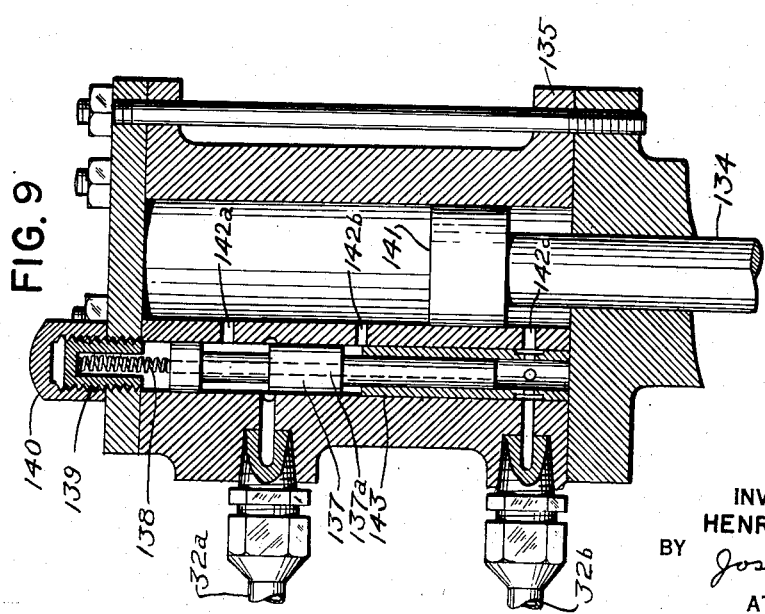
INVENTOR
HENRY H. WHEELER
BY *Joseph Shea*
ATTORNEY Jan. 26, 1954      H. H. WHEELER      2,667,173
CIGAR MACHINE
Filed Nov. 26, 1946      10 Sheets-Sheet 10

INVENTOR
HENRY H. WHEELER
BY
George S. Hastings
ATTORNEY

Patented Jan. 26, 1954

2,667,173

UNITED STATES PATENT OFFICE 2,667,173

CIGAR MACHINE

Henry H. Wheeler, Bellerose, N. Y., assignor to International Cigar Machinery Company, a corporation of New Jersey Application November 26, 1946, Serial No. 712,456

15 Claims. (Cl. 131—21)

This invention relates to cigar machines, more particularly to hydraulically operated cigar machines.

One of the main objects of the invention is to simplify the construction of cigar machines and reduce their weight and cost. Since my machine has no heavy and expensive cams, there is a considerable reduction in cost and weight. Other savings in weight and cost are obtained by elimination of shafts for supporting the cams, elimination of frames for supporting the cam shafts, elimination of gears, and elimination of driving connections. Accordingly my machine may have a weight approximately one half the weight of prior cigar machines and its cost may be considerably less.

Due to the fact that the various units of my machine are supported upon a single table, and are rearranged to save space, my machine occupies approximately five eighths of the floor space required for a previous type of machine.

The various units of my cigar machine, except the operating mechanisms of the wrapper applying mechanism and the control mechanism for the cigar re-rolling mechanism, may be operated by separate fluid-operated devices controlled by fluid delivered under pressure from a source of fluid under pressure such as a hydraulic pump. Since the various units of the cigar machine are operated by separate fluid-operated devices, there is considerably less danger of injury of the attendant by moving parts. With separate fluid-operated devices for actuating the various units the forces imparted to the moving parts to operate the same are of such a controlled and limited magnitude that no injury to the attendant will result from manual obstruction thereof, except in the case of the crimper jaws.

With mechanically driven units, which are now used on cigar machines, the moving parts may injure the attendant if obstructed; because the momentum of the entire machine must be overcome to stop any moving part which is obstructed. Although mechanism for stopping the entire machine has been heretofore provided to prevent injury in the event any of its parts are manually obstructed, the momentum of the considerable weight of the moving parts of a mechanically driven cigar machine prevents instantaneous stoppage. To obtain the same degree of safety on a mechanically driven cigar machine as on my machine a safety device would be required for most units, which would be complicated and expensive.

Another object is to provide a simplified mechanism for forming cigar bunches from bunch charges separated from a compacted tobacco column produced by assembling bunch length sections severed from the stream of filler tobacco advanced in the filler feed channel. To this end the bunch rolling apron may be raised to support the lower end of the column while a bunch charge is being cut from the lower end of the column, and the apron is then lowered and the bunch charge is rolled upon itself within a loop of the apron and rolled within a binder to form a cigar bunch. Heretofore it was necessary to move the bunch charge after separation from the column, on to the bunch rolling apron with the possibility of disturbing the tobacco in the bunch charge.

Still another object of the invention is to improve the operation of the mechanism for intermittently feeding the continuous layer or stream of filler tobacco into the column-forming means. On prior cigar machines, when the continuous stream of tobacco was advanced in the filler feed channel into the column-forming means for severance of bunch length sections from its leading end, detectable variations in the length of the severed sections resulted from variations in the mass or load of the filler tobacco in the filler feed channel. Since the filler tobacco in the filler feed channel is laid therein manually by the attendant, there may be considerable variation in the amount of the same. As a result, I believe the friction created against the side belts, which are backed up by rigid plates, by the portion of the tobacco stream which is compacted by the compactor will vary considerably. This causes more or less springing in the motivating members driving the belts and a variation in the charge or bunch length. In a cam operated machine it is not always possible to eliminate springing, as the cams are often some distance from the point where force is applied. In a hydraulic mechanism it is possible to obtain motion of the belts without springing as the hydraulic motor can be so placed that no springing is possible. Thus bunch length sections of more uniform length will be severed for assemblage into a column from which the bunch charges are separated.

In prior machines of the type wherein bunch charges were separated from a vertical tobacco column formed by superimposing bunch length sections, the column was compacted by a compactor engaging the upper end of the column and mounted on a reciprocable member and pressed against the top of the tobacco column by a compression spring. When the height of the tobacco column varied due to delivery thereto of bunch length sections of varying thickness, the spring urging the compactor against the column was compressed to a greater or lesser extent and the density of the tobacco column varied at least to some extent in acccordance with its height. Therefore cigar bunch charges varying somewhat in density were separated from the column and these variations might be great enough at times to affect the density of the cigars formed from the bunch charges. One object of the invention, therefore, is to avoid variations in the density of the compacted tobacco column from which the bunch charges are separated. For this purpose the member compacting the tobacco column is hydraulically operated by connecting it to the piston rod of a hydraulic cylinder. The hydraulic cylinder is provided with instrumentalities for maintaining an unvaried fluid pressure on the piston of the hydraulic cylinder to maintain the pressure applied to the tobacco column constant and thereby permit bunch charges of uniform density to be separated from the tobacco column. Without such instrumentalities the pressure applied to the tobacco column would vary in accordance with the resistance of the column up to a maximum pressure determined by the pressure of the fluid supplied to the hydraulic cylinder.

Still another object of the invention is to permit variation of the pressure applied to the tobacco column for compaction thereof. The instrumentalities referred to are manually adjustable to regulate the pressure applied to the tobacco column.

If desired, the cutter for severing the bunch length sections may be integral with the compactor for the tobacco column. In this case the instrumentalities for regulating the pressure in the hydraulic cylinder may be constructed to apply a greater pressure to the piston in the hydraulic cylinder during the severance of the bunch length section and then reduce the pressure applied thereto during the compaction of the tobacco column.

A further object of the invention is to provide simplified mechanism for forming the loop in the apron. The rider plate forms a part of this mechanism and serves the dual purpose of forming a loop in the apron and holding down the bunch charge while it is being spirally rolled upon itself as the loop is advanced along the bunch rolling table. As the loop is farther advanced along the bunch rolling table the rolled bunch charge is rolled within a binder previously positioned on the rolling apron to form a cigar bunch.

In the accompanying drawings, which form a part of this specification, like characters of reference indicate the same or like parts.

For conveniently locating the different figures of the drawings on the various sheets, reference may be had to the following listing of the figures of the drawings and the sheets whereon they appear:

| | Sheet # |
|---|---|
| Fig. 1 | 1 |
| Fig. 2 | 2 |
| Figs. 1A, 1B, 8B, 8A, 8H | 3 |
| Fig. 3 | 4 |
| Figs. 4, 5, 6 | 5 |
| Fig. 7 | 6 |
| Fig. 8 | 7 |
| Fig. 9 | 8 |
| Figs. 8C, 8D, 8E, 8F, 8G | 9 |
| Fig. 10 | 10 |

Figs. 1A and 1B are sectional and end elevation views, respectively, of the safety device through which the wrapper-applying device is driven from the motor driving the hydraulic pump;

Fig. 4 is a side elevation of the master valve housing with certain portions of the housing cut away in order to expose certain valves and the cam operating the same;

Fig. 5 is a sectional view of one of the valves taken on the line 5—5 of Fig. 4;

Fig. 6 is a sectional view of the master valve housing on line 6—6 of Fig. 4;

Figs. 8A and 8B are sectional views of the hydraulic motor operating the bunch rolling apron and showing the motor in two different positions;

Figure 10:
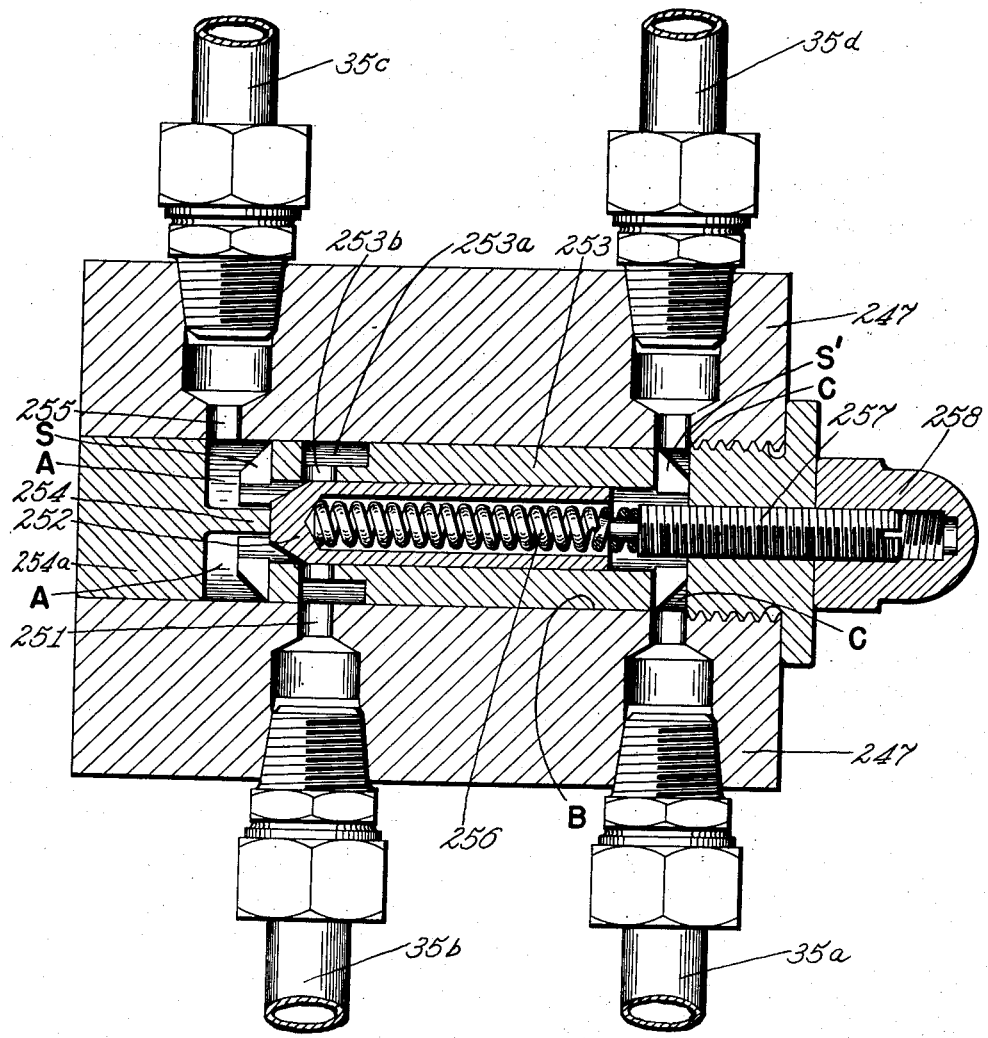

Figs. 8C–8G, inclusive, are detail side elevations of the rider plate showing it in various positions wherein it forms the loop in the bunch rolling apron and serves to hold down the bunch charge while it is being rolled upon itself;

Fig. 8H is a detail view showing the arrangement of the diametral ports of the rotor of the motor operating the bunch rolling apron;

Fig. 9 is a longitudinal sectional view on an enlarged scale of the hydraulic cylinder for operating the bunch length cutter. This view illustrates the mechanism for maintaining a constant pressure on the piston of the hydraulic cylinder;

Fig. 10 is a sectional side elevation showing the flow control valve regulating the load on the rolling pin of the bunch rolling machine.

The hydraulic cigar machine selected to illustrate the invention includes the following components which correspond to similar units of prior mechanically driven cigar machines. These units or assemblies are visible above the supporting table L of my machine and are all hydraulically operated in properly timed relationship with the exception of the wrapper applying mechanism.

The filler feed F (Figs. 1 and 7) which may be considered as the first hydraulically operated unit, is provided with a cross feed including two vertical intermittently traveling belts 99 and one intermittently traveling horizontal belt 100. The upper run of the horizontal belt and the inner runs of the vertical belts form a filler feed channel in which filler tobacco is manually laid to form a layer of tobacco which is advanced into a measuring chamber or magazine where bunch length sections are cut off from the leading end of the tobacco layer. The severed bunch lengths are superimposed in the measuring chamber to form a column which is compacted to a predetermined density, and bunch charges are separated from the compacted column and transferred to a bunch rolling table T (Fig. 1), upon which the bunch charge is rolled or wrapped within a binder to form a cigar bunch. The filler feed F and bunch rolling table T will be described in detail following the general description of the cigar machine.

Figure 1:
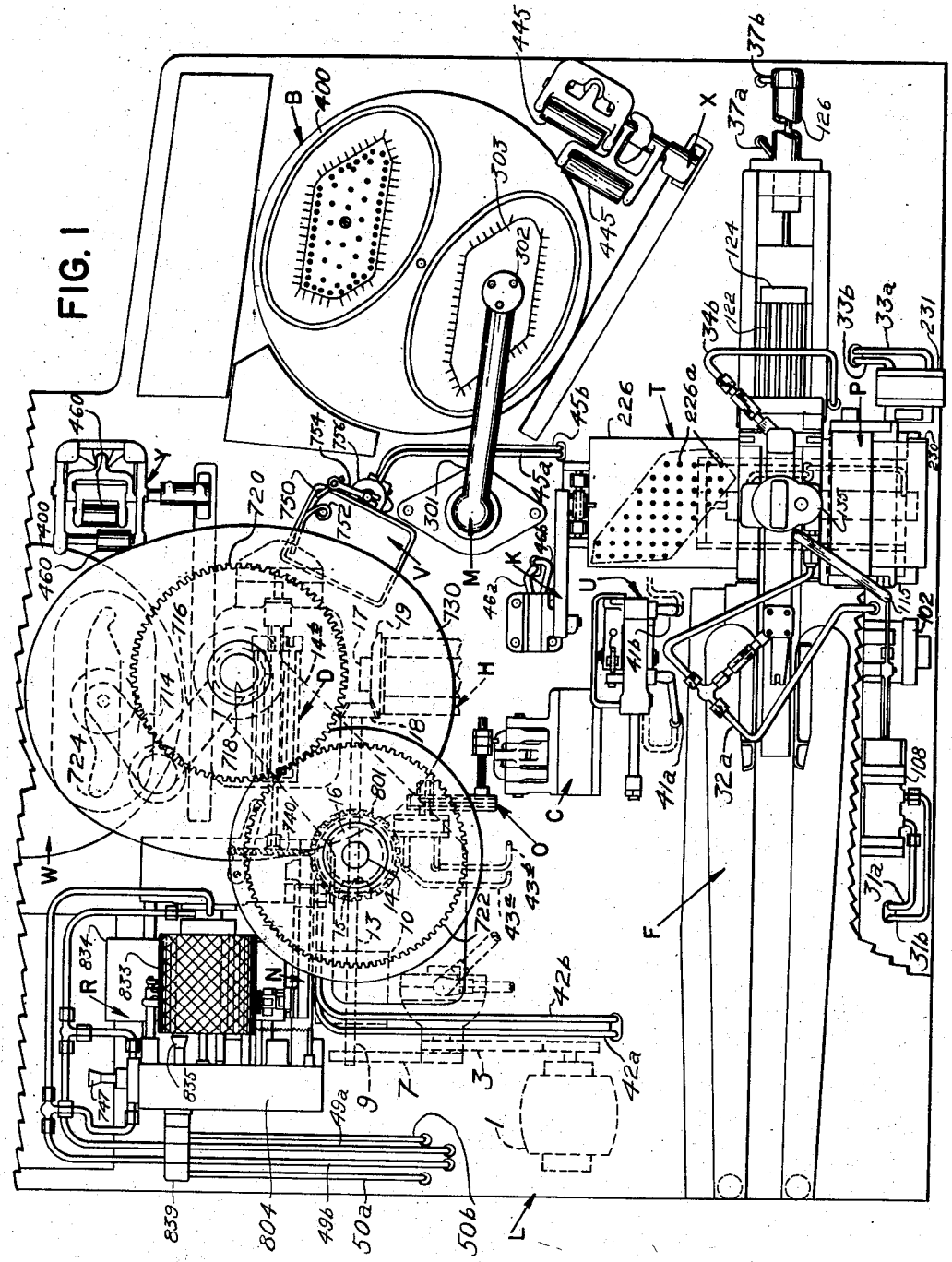
Fig. 1 is a plan view of a hydraulic cigar machine exemplifying my invention and showing in their proper position relative to each other all main components or assemblies which are visible above the table of the cigar machine.
Figure 2:
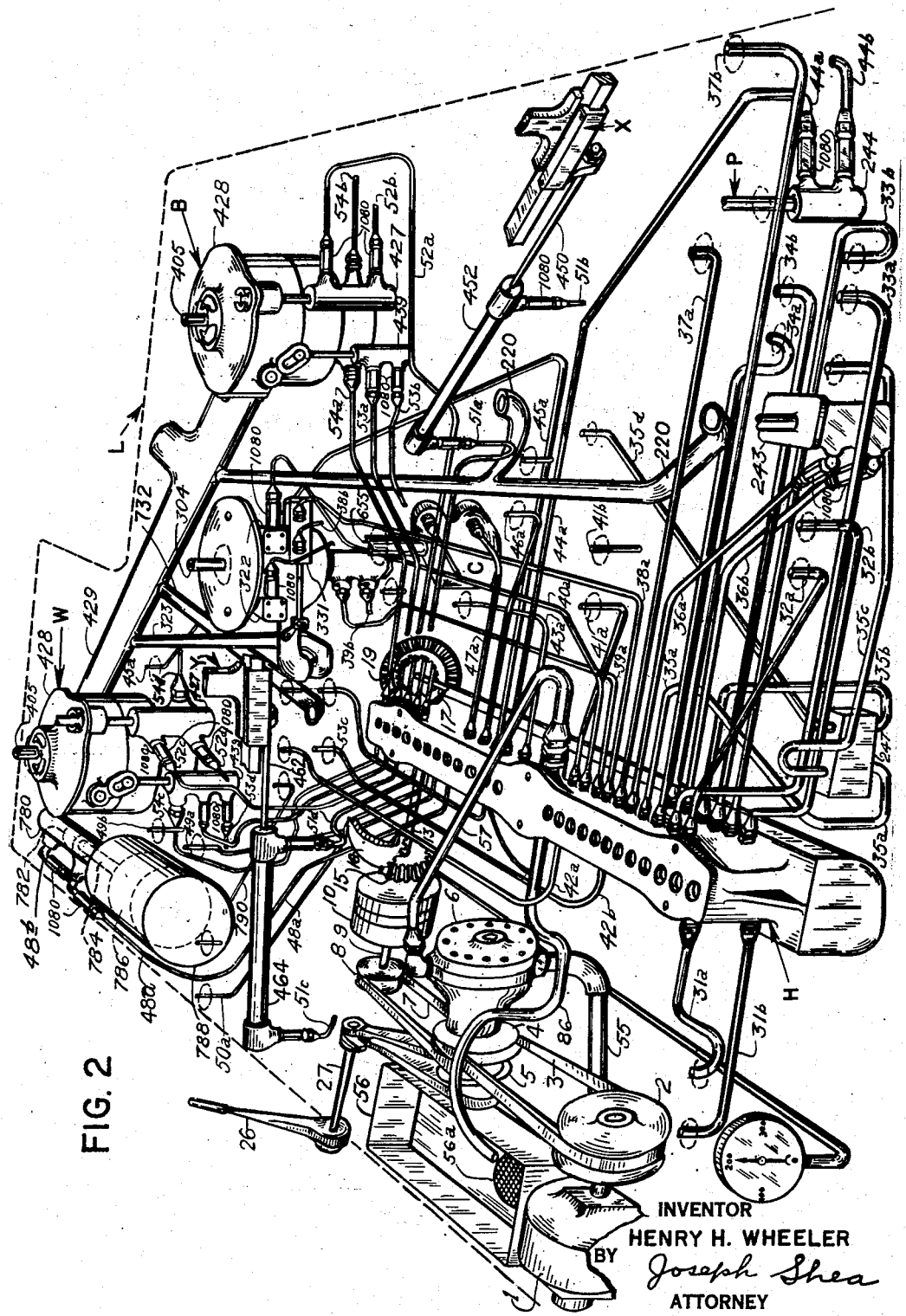
Fig. 2 is a perspective plan view of all those components or assemblies which might be seen below the table if said table were transparent. This view is given mainly to illustrate the main hydraulic circuit and shows the suction lines as well.
Figure 3:
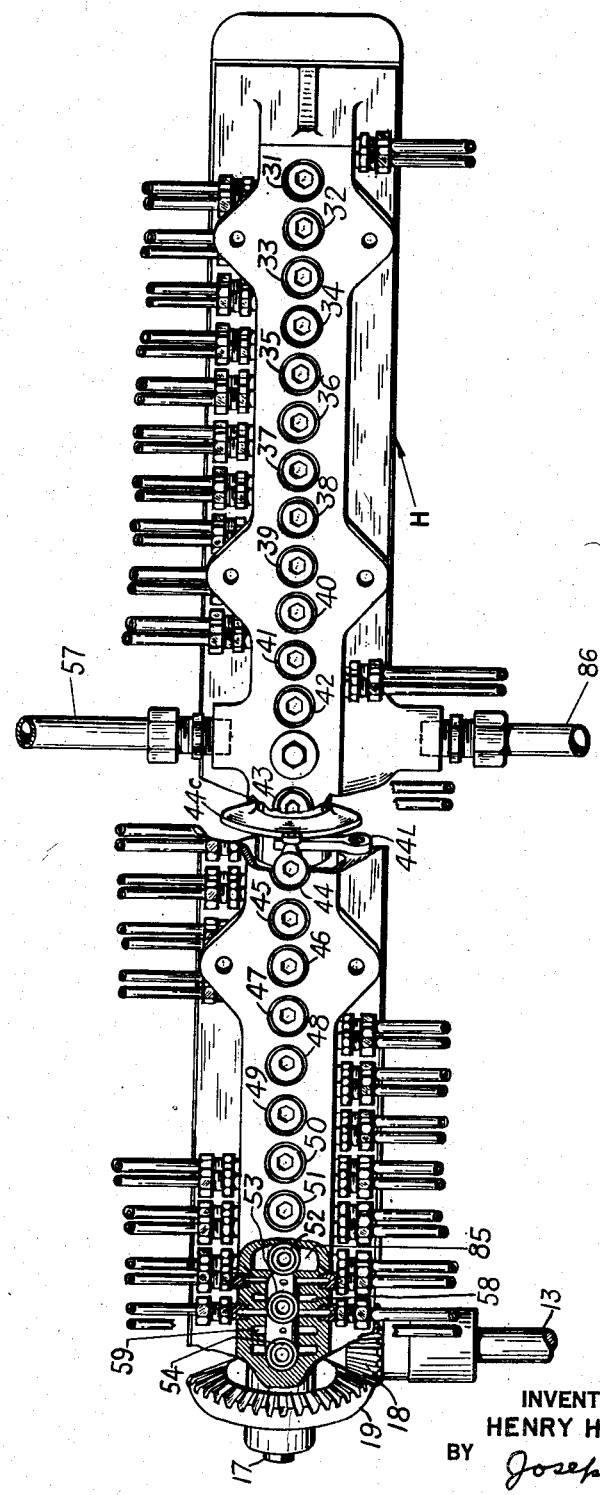
Fig. 3 is a plan view of the master valve housing taken in a slightly inclined position thereof and showing its general external appearance with certain portions of housing cut away to expose certain valves, the cam shaft, and one of the cams controlling the valves.

Also shown in Fig. 1 is an intermittently rotating die turret B, bunch transfer K, paster U, crimper C, bunch transfer O, wrapper paster V, wrapper applying device D and rerolling mechanism R.

Rolling table T is provided with a rolling apron and a sliding carriage on which is pivoted a device P for operating the rider plate (Fig. 1). At the proper time the bunch charge delivered from the filler feed F is rolled upon itself within a loop formed in the apron by the rider plate and then rolled within the binder to form a cigar bunch, the paste applied by the binder paster U assisting in holding the binder on the bunch.

All these units are located above the table L (Fig. 1). Certain mechanisms, such as the drive, the master valve and the piping are located under table L, but these require little space and are so arranged that there is plenty of room for cleaning of the floor and maintenance of the machine.

Drive

The drive for my machine (Figs. 1, 1A, 1B, 2, and 3) is provided with an electric motor 1 carrying a pulley 2 on its shaft. A belt 3 is driven from pulley 2 and drives a pulley 4 (Figs. 1A and 1B) which is loosely mounted on a sleeve 21 keyed on the shaft 22 of a pump 6. The sleeve 21 has a flange 23 against which is seated a ring 24 formed of suitable friction material and interposed between the pulley 4 and flange 23. A clutch pulley 5 is threaded on the sleeve 21 and held in driving engagement with pulley 4 by a torsion spring 20a. One end of torsion spring 20a is anchored in a lock nut 25 threaded on sleeve 21, and the other end of spring 20a is anchored in pulley 5. Thus the pulley 4 will be pressed against the friction material 24 to drive shaft 22 and operate pump 6, and pulley 5 will be driven. A belt 7 on pulley 5 drives pulley 8 on reduction drive shaft 9. The shaft 9 drives reduction gearing of the well known planetary type enclosed in housing 10.

There is provided a brake 20 (Figs. 1A, 1B and 2) having a handle 26 fastened on a shaft 27 suitably supported from table L. On shaft 27 is secured a brake piece 28 to which is pivotally connected a brake piece 29 whose free end engages a yoke 30 secured on shaft 27. The brake pieces 28 and 29 enclose a circumferential flange on pulley 5 and normally permit it to rotate freely. When the handle 26 is pulled downwardly the circumferential flange on pulley 5 is gripped by the brake pieces 28 and 29 and the pulley 5 will be unscrewed from the position wherein it engages pulley 4. When handle 26 is released by the operator, the torsion spring 20a shown in Figs. 1A and 1B will cause the pulley 5 to be screwed into engagement with pulley 4 and the operation of the machine will be resumed.

Master valves

The hydraulic pump 6, which may be a vane type pump of conventional construction, is supplied with oil by pipe 55 from an oil reservoir 56 (Fig. 2) wherein it is filtered by filter 56a. The oil is delivered from pump 6 under pressure through a pipe 57 to a cored out chamber 58 in the master valve housing H (Figs. 3–6). This cored out chamber runs the entire length of the valve housing and feeds oil to each of twenty-four four-way master valves numbered 31–54 inclusive. Other cored out passages 59 and 85 in this housing, which communicate with each other as shown in Fig. 6, receive the exhausted oil from these valves and return it to reservoir 56 through pipe 86.

Each four-way valve is of a well known type, its function being to feed fluid to either side of a fluid motor, as desired, and to return the fluid from the opposite side of the fluid motor to the reservoir or sump 56. Each of the valves 31–54 inclusive is provided with a stationary sleeve 90 secured in housing H. In sleeves 90 are slidably mounted spool-shaped members 87. Members 87 are provided on their central and end portions with heads which have a diameter greater than the rest of member 87, as is shown in the case of valve 54 in Fig. 5. Each valve sleeve 90 has five pairs of opposed slots which are so spaced that three pairs of slots, which communicate with the passages 58, 59 and 85, are normally closed by the heads on valve spool 87. The lower ends of valve spools 87 are tapered and rest on cam levers 31L–54L inclusive, which carry cam rollers 31R–54R inclusive, which engage cams 31C–54C inclusive, secured on cam shaft 17. The cam levers 31L–54L inclusive, are mounted on a shaft 91 supported in the master valve housing H, and springs 92 seated in sockets in the upper ends of valve spools 87 and engaging plugs 93 threaded into the master valve housing, keep the cam rollers of these levers in engagement with cams 31C–54C inclusive.

It will be apparent that if the valve spools 87 are slightly raised or lowered that oil will flow under pressure from chamber 58 through the central pair of slots in sleeve 90, which are normally closed by the central head of the valve spools 87, and then through either the uppermost or lowermost pair of slots in sleeve 90, which are normally closed by the upper or lower head of spools 87, into either the chamber 59 or chamber 85. Thus the oil flowing from chamber 58 through the slots in sleeve 90 opened by the central head will also be delivered through either pair of slots in sleeve 90 intermediate the central and the outermost slots into ports formed in the sides of the main valve housing H and communicating with the intermediate slots in sleeve 90. These ports are connected by pipes as for example 54a and 54b to a hydraulic motor or cylinder, as will be hereinafter described, so that the oil will flow through one pipe into the motor or cylinder and be returned by another pipe to either the chamber 59 or 85.

There are twenty-eight pairs of pipes connected to the ports in the sides of the master valve housing H. A pair of pipes leads from each pair of these ports to each of the respective hydraulic motors or cylinders which operate various mechanisms, with the exception of valves 51, 52, 53 and 54. These four valves have two pairs of pipes for each valve to supply oil to the two die turrets which are simultaneously indexed by 180 degree steps, the suction head lifter of each turret, the suction control for each turret, and the roller cutters of each turret.

A relief valve 98 of conventional construction (Fig. 6) allows oil to escape from pressure chamber 58 into the exhaust chamber 85 when the oil pressure in chamber 58 becomes excessive and thereby maintains the oil pressure in chamber 58 below a predetermined maximum. The portions of the chambers 59 and 85 adjacent pipe 86 communicate with each other, as shown in Fig. 6, to provide a common outlet into pipe 86.

Reduction gearing (Figs. 4 and 5) including a ring gear 94 secured to cam 54C, a pinion 95 keyed on cam shaft 17, and an intermediate gear 96 mounted on a stub shaft 97 supported in housing H, is provided for driving the cam 54C at one-half the speed of shaft 17. The other cams 31C–53C inclusive, are secured to shaft 17 and are revolved at the same speed as shaft 17.

*Cross feed, column forming, and charge measuring and severing*

Figure 7:
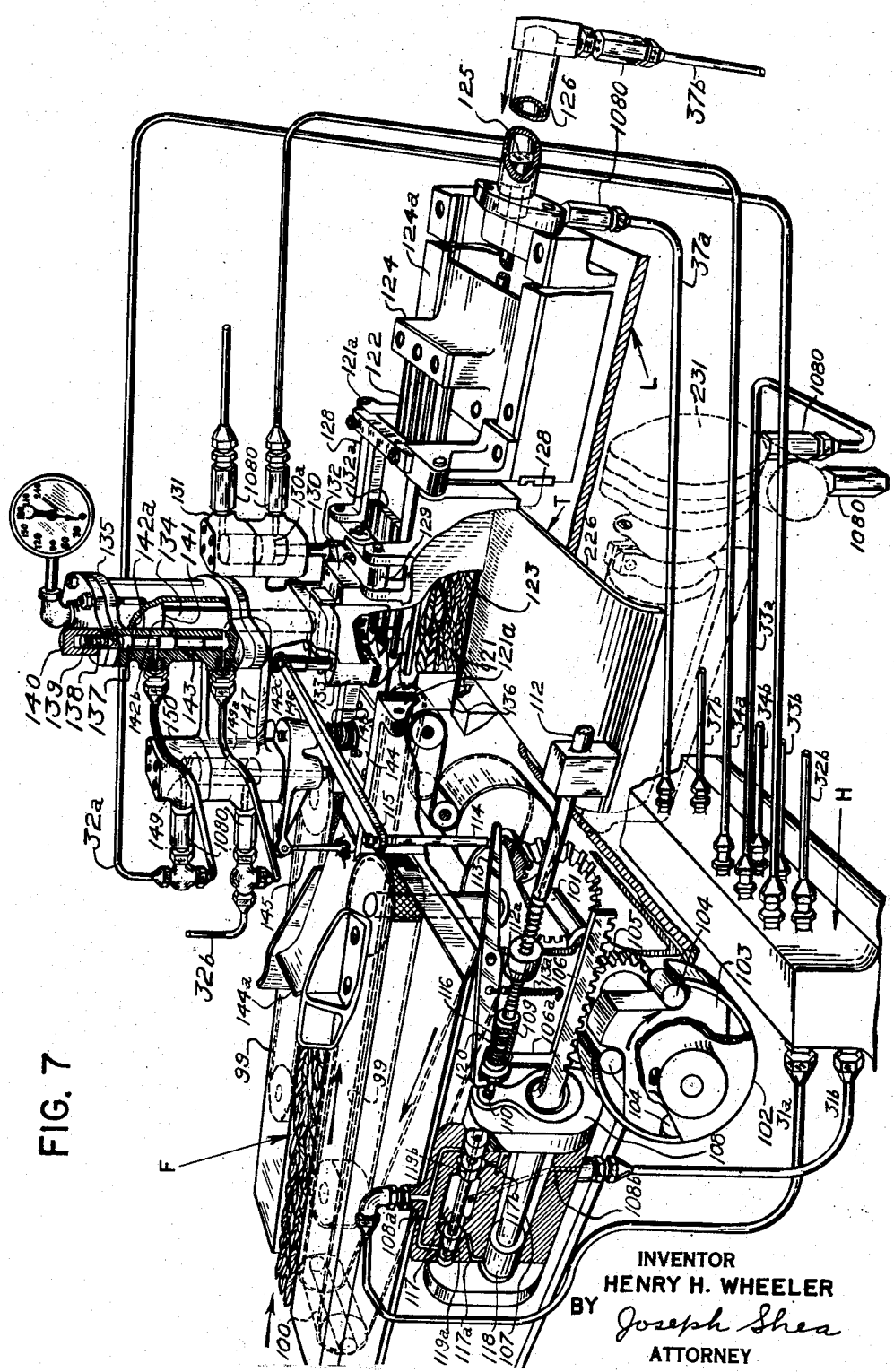
Fig. 7 is a perspective view of the filler feed showing a portion of the bunch rolling table and the hydraulic circuits for same, certain portions thereof being broken away.

Referring now to Fig. 7 of the drawings wherein is illustrated the filler feed of my cigar machine. The filler feed includes a cross feed provided with two side belts 99 and one bottom belt 100 arranged to form a filler feed channel in which stemmed leaf tobacco is manually placed to form a continuous layer of tobacco. Each of the belts 99 is trained about a driving pulley and an idler pulley, and both driving pulleys are driven from shaft 101 through two pairs of bevel gears, one pair of bevel gears being shown in Fig. 7. One of these bevel gears is secured on shaft 101 and meshes with and drives a bevel gear on an upright shaft carrying one of the driving pulleys. The other pair of bevel gears (not shown) also consists of a bevel gear on shaft 101 driving a bevel gear on an upright shaft carrying the pulley driving the other belt 99. A drum secured on shaft 101 and shown in Fig. 7 drives the belt 100 which is looped over a series of idler pulleys to provide a horizontal run extending along the lower edges of belts 99. Since the construction of the filler feed channel and the arrangement of the bevel gears for driving the pulleys of belts 99 is conventional and shown in my Patent No. 2,311,011, further description thereof is deemed unnecessary.

Attached to the outer end of shaft 101 is a drum 102 having a concentric internal bore. A four-toothed ratchet 103 loosely mounted on shaft 101 and provided with rollers 104 mounted in recesses of the ratchet to engage drum 102, and a gear 105 attached to the hub of ratchet 103, form a roller clutch of conventional construction. Meshing with and driving gear 105 is a rack 106 cut in the end of a piston rod 107 protruding from the hydraulic motor 108. The post 106a extending upwardly from rack 106 engages one side of a flange on a sleeve 109 slidably mounted on a valve rod 110 which also protrudes from motor 108. Inside sleeve 109 is provided a spring 116 attached at one end to valve rod 110 and attached at its other end to a bar 112 which is fastened to sleeve 109. When nuts 112a threaded on bar 112 are engaged by post 106a during the outward movement of rack 106, the spring 116 will be stretched in a manner hereinafter described. Bar 112 is slidably mounted in the frame of the machine.

In the protruding portion of valve rod 110 are two annular grooves properly spaced to be engaged by rocker arm 113 at the end of each stroke of the valve rod 110. The arm 113 is maintained in engagement with either of said annular grooves by a tension spring 113a and disengaged therefrom by a pin 114 on an arm 115 attached to and moving with cutter 133 on vertical reciprocating block 132 in a manner which will be presently described.

In the operation of my cross feed, pin 114 comes down and strikes rocker arm 113, disengaging same from the left hand groove in the protruding portion of valve rod 110. Then spring 116 forces the valve rod 110 inwardly to displace the valve spool portion 119a thereof sufficiently to open port 117a leading from a chamber 117 communicating with pipe 31b to the left hand side of piston 118. Rod 110 remains in this position waiting for master valve 31, which is connected to pipe 31b to open at the proper time. In the meantime, pin 114 ascends and allows rocker bar 113 to engage the right hand annular groove in the protruding portion of valve rod 110. At the proper time master valve 31 opens, allowing oil under pressure to pass through pipe 31b into the cored out chamber 117 in motor 108 and thence past valve spool portion 119a of rod 110 and through to the left hand side of piston 118. The piston 118 is thus displaced to the right, and the oil on the right side of the piston passes out of the cylinder and into the right hand port 117b. The spool valve portion 119b of valve rod 110 is in a predetermined position shown in Fig. 7 at this time to permit the oil flowing into the right hand port 117b to flow into a drilled passage 108a formed in motor 108 and communicating with pipe 31a and then back to master valve 31.

When piston 118 has moved far enough to the right for post 106a to strike nuts 112a threaded on rod 112, rod 112 is moved to the right sufficiently to stretch spring 116. Thus sleeve 109 is displaced to the right until the flange on this sleeve strikes a corner 120 formed on rocker arm 113 and raises arm 113 to disengage it from the right hand annular groove in rod 110. The spring 116 which is now under tension, pulls valve rod 110 to the right, thereby reversing the oil flow from the left side of the piston 118 to the right side of the same while arm 113 engages the left hand annular groove in rod 110. The oil now flows from chamber 117 through port 117b into the cylinder. This causes piston 118 to travel to the left, and as post 106a strikes the flange on sleeve 109, it compresses spring 116 so that it will be ready for the next cycle. The oil now displaced by piston 118 flows through port 117a into the passage 108a to be returned to valve 31, the valve spool portion 119a being in position to permit the oil to flow from port 117a to port 108a.

As rack 106 moves to the right with piston rod 107, gear 105 is rotated to turn ratchet 103 and cause rollers 104 to drive drum 102 on shaft 101. Shaft 101 is thus driven in the proper direction to advance cross feed belts 99 and 100 to the right. The rack 106 when moving to the left, turns gear 105 and ratchet 103 in the opposite direction; but rollers 104 do not drive drum 102 and there is no motion of same. Since there will be no springing of the rack 106 when it drives shaft 101, despite variations in the friction of the belts 99 against rigid plates (not shown) which engage the inner sides of these belts to back up the same, the tobacco will be advanced by uniform increments and bunch length sections of uniform length will be separated from the leading end of the tobacco stream. Heretofore variations in the amount of the filler tobacco manually laid in the filler feed channel would produce variations in the amount of friction between belts 99 and said plates along the portion of the filler stream which is compacted by mechanism hereinafter described. Therefore variations in the friction of belts 99 against said plates would create different degrees of springing of the driving parts for these belts in prior machines and thus vary the length of the increment by which the tobacco stream is advanced and consequently produce variations in the length of the cut charges.

Bunch length sections are severed from the layer of tobacco advanced by the belts 99 and 100 and assembled in a magazine 121 to form a vertical column of tobacco which is compacted to a predetermined density prior to separation of bunch charges from the lower end of the column. When magazine 121 has received a sufficient number of bunch length sections, pin 114 on arm 115 of block 132, which is controlled by mechanism hereinafter described, fails to go down for enough to release bar 113, and the feeding of the layer of tobacco by belts 99 and 100 stops until the level of tobacco in the magazine has been reduced. It will be seen from the above description that when nuts 112a are adjusted along bar 112 the length of the bunch length sections can be increased or diminished to suit the required cigar length, since the extent of the forward travel of the belts 99 and 100 is controlled by the position of nuts 112a.

Continuing with the description of the filler feed shown in Fig. 7, the layer of filler tobacco is advanced by the belt 100 into the upper portion of a measuring chamber or magazine 121 having side walls extending along the lateral edges of the belt 100 and across the rolling apron 226 hereinafter described. The leading end of the tobacco layer is fed between the side walls of magazine 121 and on to fingers 122. These fingers and the charge-cutting knife 123, which forms the bottom of magazine 121, are attached to a slide 124 guided by a frame 124a attached to the table L. Slide 124 is connected to a piston rod 125 projecting from cylinder 126. Master valve 37 opens to allow oil under pressure to flow through pipe 37a into cylinder 126 and displace piston 125 and slide 124 outwardly. Thus fingers 122 will be retracted and knife 123 will be pulled out from under the tobacco column which is formed in magazine 121 in a manner hereinafter described and supported on knife 123. Moreover, when slide 124 is moved outwardly, the leading end of the tobacco layer advanced on to the fingers 122 by belt 100 will be deposited on top of the vertical column of tobacco in magazine 121 while the tobacco column is supported on the bunch rolling apron 226 after withdrawal of knife 123. Apron 226 is supported by a platform which will be described later.

The cam 37c operating valve 37 is so timed that after the leading end of the tobacco layer has been fed on to fingers 122, the valve 37 is lowered to place the pressure chamber 58 in communication through the uppermost pair of slots in sleeve 90 and the adjoining pair of intermediate slots in said sleeve with the upper port in the side of the main valve housing, which is connected to the pipe 37a, to cause slide 124 to move outwardly. The oil so displaced by piston 125 will be returned by pipe 37b to chamber 59 through valve 37.

The charge-cutting knife 123 is guided by rails (not shown) extending underneath the knife along the longitudinal edges thereof. These rails are attached to the lower edges of swinging members 128 pivoted on brackets supported by frame 124a and lugs 121a on the side walls of the magazine 121. Members 128 are provided with upwardly extending lugs which are pivotally connected to a toggle 129 which is connected to a piston rod 130 protruding from cylinder 131.

Piston rod 130 is connected to a piston 130a in the cylinder 131. The flow of oil under pressure from chamber 58 of the main valve housing to pipe 34a, which communicates with the lower end of cylinder 131, is controlled by master valve 34 to lift the piston 130a and swing the members 128 outwardly when the knife 123 is withdrawn. The oil displaced in the cylinder 131 by the upward movement of piston 130a is returned through pipe 34b to the valve 34 which is then in position to permit the oil to flow into exhaust chamber 59.

On a block 132, which slides vertically between the side walls of the magazine 121, is formed a corrugated cutter 133 having a configuration corresponding to the desired shape of the head ends of the severed bunch lengths and the desired shape of the indentations in the tuck ends of the same. Block 132 has a series of vertical slots 132a extending up from its bottom and into which the fingers 122 project when they are moved inwardly and is attached to a piston rod 134 projecting from cylinder block 135. Cutter 133 coacts with a lower corrugated cutter or ledger plate 136, which has indentations fitting the configuration of cutter 133, to sever a bunch length from the leading end of the tobacco layer advanced by belts 99 and 100 on to fingers 122 after the latter are withdrawn. In this manner the severed bunch lengths will be superimposed to form a vertical tobacco column in magazine 121. The cutter 136 is supported by extensions of the side walls of magazine 121, which extend along the delivery end of belt 100, in a position to support the tobacco stream as it is advanced thereover on to fingers 122.

A spool valve 137 (Figs. 7 and 9) is slidably mounted in a bore of the cylinder block 135 which is connected by three ports 142a, 142b and 142c to the bore in which piston 141 is mounted. Valve 137 is normally maintained in a predetermined position to open port 142a and close port 142b by a spring 138 engaging an adjusting screw 139 threaded into the top of cylinder block 135 and covered by a sealing cap 140. The pressure applied by the block 132 to the tobacco in magazine 121 to compress the same to a predetermined density should be considerably less than the pressure required on the cutter 133 to sever a bunch length from the leading end of the tobacco layer advanced into the magazine, because the pressure required for severance of the bunch length section would crumble the tobacco in magazine 121 if applied thereto. For this purpose the fluid supplied through pipe 32a after valve 32 is opened at the proper time by its cam 32c is delivered under pressure into a port in the cylinder head 135 tending into the bore in which the spool valve 137 is located and flows through the port 142a into the space above piston 141 to apply sufficient pressure to knife 133 to sever the bunch length section. The pressure applied to the piston 141 will be determined by the resistance of the tobacco being cut. The pressure applied to piston 141 will correspond to the resistance of the tobacco during the cutting of the bunch length up to a predetermined maximum corresponding to the pressure at which oil is delivered from pump 6. The fluid displaced by piston 141 flows out through port 142c into pipe 32b and is returned through valve 32 to the reservoir 56.

The severance of the bunch length section is completed when the piston 141 reaches port 142b, so that when the piston is below this port the pressure of the fluid passing through port 142b and seeping under the portion of valve 137 seated against a bushing 143 will lift the valve 137, to partially close the port communicating with pipe 32a, as shown in Fig. 9. Therefore the pressure applied to head 132 while it is compressing the tobacco column in magazine 121 will be reduced sufficiently to avoid disintegration of the same. This pressure will remain unvaried during the compression of the tobacco column and head 132 will continue descending until the column is compacted to a predetermined density. Therefore bunch charges of uniform density will be separated from the lower end of the column by knife 123, and the cigars formed therefrom will be of uniform size.

Since the pressure of spring 138 determines the pressure which must be applied to valve 137 to lift the same into position to partially close the port communicating with pipe 32a, it will be seen that by adjusting nut 139 to regulate the tension of spring 138 the pressure applied to piston 141 during the compression of the tobacco column may be regulated. Thus the desired unvaried pressure may be applied to head 132 and the column will be compacted to the desired density. When valve 32 is reversed to permit fluid to flow through port 142c and lift the piston 141, fluid under pressure will also flow through perforations in the lower end of bushing 143 into the interior thereof and upwardly through an axial port 137a (Fig. 9) in valve 137 into the space above the upper end of valve 137 and displace the latter downwardly into engagement with bushing 143. Thus the port leading from the bore in which valve 137 is mounted to pipe 32a will be fully opened and the fluid displaced by the upward movement of piston 141 will flow through port 142a past valve 137 into pipe 32a to be returned to sump 56.

Operating to compress the layer of tobacco in the filler feed channel at the same time that the block 132 is moved downwardly to compress the tobacco column, is a pressure plate 144 having a plate 144a hinged thereon and operated by an arm 145 pivotally connected to one end of a head 146. On the opposite end of this head 146 is slidably mounted a pin 147 attached to plate 144. A compression spring 148 is interposed between head 146 and plate 144. Head 146 is connected to a piston 149 by piston rod 149a protruding from a cylinder 150 which is connected to pipes 32a and 32b and controlled by the valve 32. Therefore, when valve 32 is operated by its cam 32c to force piston 141 down in cylinder head 135, fluid will be supplied simultaneously to cylinder 150 through pipe 32a to displace piston 149 downwardly. Therefore head 146 will operate the compressor foot 144 to compress the underlying portion of the layer of tobacco in the filler feed channel and its extension 144a will be swung down to press the tobacco into the filler feed channel.

Fingers 122 enter the slots 132a in head 132 in positions above the upper end of the tobacco column after the head 132 has compressed the tobacco column. To move the slide 124 inwardly for this purpose the valve 37 is operated by its cam to cut off the supply of fluid to pipe 37a and deliver it to the other side of piston 125 through pipe 37b whereby the slide 124 will be moved inwardly. Inward movement of slide 124 will also cause the knife 123 to separate a bunch charge from the lower end of the tobacco column and will be further described in connection with the bunch rolling table. The tobacco column will be held down by the fingers 122 while the block 132 is raised and the next tobacco layer is fed on to fingers 122.

When the valve 32 is displaced by the cam 32c to cut off the flow of fluid into pipe 32a and permit it to flow into pipe 32b, the piston 141 in cylinder head 135 will be displaced upwardly to raise the block 132 and cutter 133. Piston 149 in cylinder 150 will simultaneously be raised to lift the compressor foot 144 and its extension 144a, to permit the tobacco layer to be fed on to the fingers 122.

The knife 123 is formed from a thin sheet of suitable metal and has a V-shaped indentation (not shown) on its forward end on which the cutting edge is formed. With this shape of cutting edge there is less interference with the movement of the knife through the tobacco column during the cutting of the bunch charge. Moreover I believe that the arrangement of the knife to separate the bunch charge lengthwise thereof from the tobacco column will result in less displacement of the tobacco in the column, because a smaller width of the knife engages the column than in the case of a knife moving through the column transversely the bunch length. It will be observed that the tips of the fingers 122 extend sufficiently into the indentations of the ledger plate 136 to hold down the fish tails formed by severance of the bunch length sections. Thus the layer of filler tobacco on belt 100 may be fed on to the fingers 122 without interference by upwardly projecting fish tails in the column. In a prior construction wherein the knife was moved transversely of the bunch length to separate the bunch charge, the fingers were moved with the knife into positions overlying the top of the column and did not hold down the fish tails adjacent the ledger plate.

The swinging members 128 guide the cutting edge of knife 123 into a slot provided below the ledger plate 136 to admit the same. When members 128 are swung apart any tobacco accumulating thereon will fall off. Thus tobacco cannot accumulate on these members in sufficient quantity to interfere with the operation of knife 123.

*Bunch rolling table*

The bunch rolling table (Fig. 8) includes a bed 201 secured to table L and provided with a cover plate 203 to form a suction chamber 202. Plate 203 has longitudinal grooves in which perforations are located. Fastened to either side of bed 201 are two stationary racks 204 and 205. Meshing with these two racks are two pinions 206 and 207, pivoted on the ends of a yoke 208 which is fastened to a piston rod 209 operated by a piston 249 in a cylinder 248 hereinafter described. Above pinions 206 and 207 are two racks 210 and 211 which are slidably mounted on bed 201 and secured to the lower ends of a U-shaped bracket 212. On a shaft 213 supported by lugs of bracket 212 a pair of links 214 and 215 are fastened on the portions of shaft 213 projecting from the lugs of bracket 212 (Figs. 8 and 8C–8G). A bunch rolling pin or roller 216 is mounted on a shaft 216a which is supported in the free ends of links 214 and 215. Arms 217 and 218 are pivotally mounted on the ends of shaft 216a and have attached thereto a rider plate 219.

Figure 8:
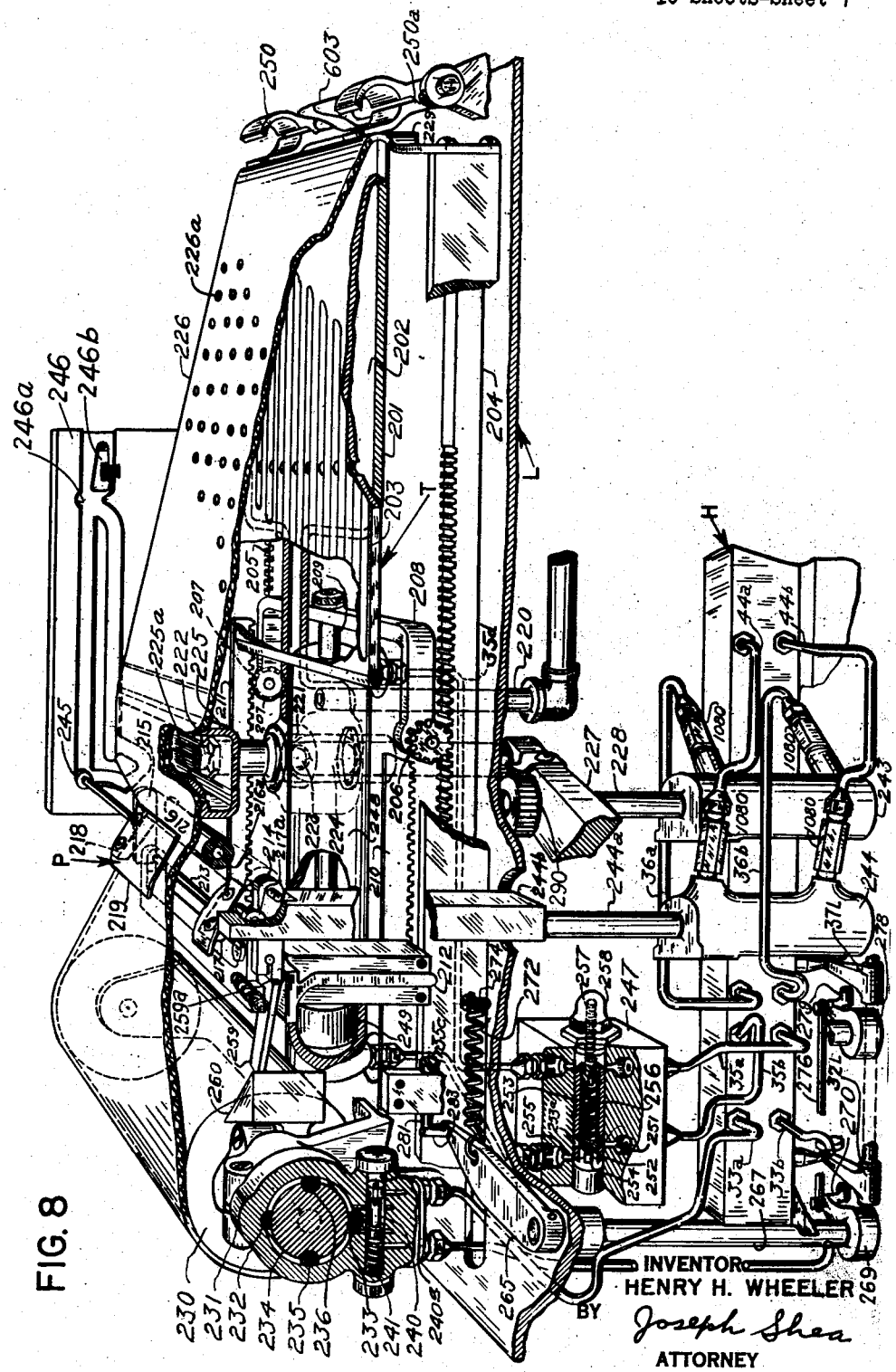
Fig. 8 is a perspective view of the bunch rolling table showing the hydraulic circuits for operating the various parts thereof, certain portions thereof being broken away.

A pair of suction chambers 221 communicate with the suction chamber 202 (only one suction chamber being shown in Fig. 8). Each suction chamber 221 is connected by a pipe 220 (Fig. 2) through pipe 429 to a source of suction (not shown). Two tubes 222 (only one tube 222 being shown in Fig. 8) are slidably mounted in suction chambers 221 and have holes 223 in the portions thereof extending within the suction chambers 221 whereby suction will be maintained continuously in tubes 222. Mounted on the upper ends of tubes 222 is a hollow platform 225 having a flat top with a considerable number of drilled holes 255a therein to cause suctional adhesion of the overlying portion of the rolling apron 226 to the top of platform 225. Attached to the lower ends of tubes 222 is a cross bar 227 which is connected at its central portion to a piston rod 228 to raise platform 225 into the position shown in Fig. 8C to support the lower end of the tobacco column in magazine 121 after the knife 123 is withdrawn from underneath said tobacco column. An adjusting nut 290 threaded on the upper end of rod 228 permits adjustment of the position of platform 225.

One end of the bunch rolling apron 226 is clamped against one end of bed 201 by bar 229 and its other end is secured to a take-up roller 230. Apron 226 extends across the top of cover plate 203 and platform 225, and passes between the rolling pin 216 and the inner end of the rider plate 219.

The apron take-up roller 230 is adjustably attached to the shaft of a rotor 234 of a rotary hydraulic motor 231, the shaft protruding from the housing of this motor and roller 230 being suitably secured on the protruding portion of said shaft. This motor has a concentric bore in its housing with two semi-circular grooves at the top and bottom of the bore. Plugs 232 and 233 are then set in these grooves and have faces which engage the rotor 234, these faces being concentric to a running fit with rotor 234. Plugs 235 and 236 are set into the rotor 234 in diametrically opposite positions and are turned and ground to provide faces concentric to a running fit with the bore of the housing of motor 231. In an opening formed in the portion of the housing of motor 231 below the rotor 234 is a bore 240a having a slide valve 240, backed up by a light spring 241 normally maintaining valve 240 in a position shown in Fig. 8B, to permit oil to flow through port 237 and past valve 240 into port 238. Ports 237 and 238 are formed in the housing of motor 231, and port 237 is connected by a pipe 33a to the master valve 33. When cam 33c opens valve 33 oil will flow under pressure through port 237 and past valve 240 into a port 238 and against the plug 236. The oil will also flow through the diametral port 239a shown in Figs. 8A and 8H extending through the rotor 234 and plugs 236 and 235 and communicating with the space 234a from the plug 232 to the plug 235 between the rotor 234 and its housing. Thus the oil will also flow through port 239a against plug 232. The rotor will thus be turned in a counter-clockwise direction to remove the slack from apron 226 to discharge the bunch at the end of the rolling table. Since the port 239 is open at the time valve 240 is in the position shown in Fig. 8B during the counter-clockwise rotation of rotor 234, oil in the space 234d from plug 233 to plug 235 between the housing and the rotor will be displaced by plug 235 through ports 239 and 244 into the pipe 33b to be returned through valve 33 to reservoir 56. The oil ahead of the plug 236 in the space 234c from plug 232 to plug 236 between the rotor and its housing will be forced through the other diametral port 239b, which extends through the rotor and plugs 235 and 236 and is shown in Figs. 8B and 8H, and will flow through port 239 and past valve 240 into port 244 to be returned through pipe 33b to valve 33.

A duct 242 formed in valve 240 extends from the port 237 to the right hand end of the valve, so that oil will flow through duct 242 and seep between the right end of valve 240 and the motor housing until it builds up sufficient pressure to overcome the resistance of spring 241. The valve 240 will then be moved to the left to the position shown in Fig. 8A and will close port 237 to shut off the flow of oil to the motor. It can be seen that the torque counterclockwise cannot exceed that furnished by the spring 241 so that the rolling apron will not be stretched unduly.

When the platform 225 is raised to the position shown in Fig. 8C in a manner which will be hereinafter described, the rotor 234 will be turned in a clockwise direction. Oil in the space 234b between plugs 233 and 236 will thus be forced through the diametral port 239a into the space 234a between plugs 235 and 232.

As can be readily seen from the above description, a reversal of oil flow created by cam 33c displacing the master valve 33 to permit oil to flow from valve 33 into pipe 33b will cause the oil to flow into port 244 and displace valve 240 to the right. The port 239 will thus be opened and oil will flow therethrough against plug 235 and through port 239b into the space 234c and turn the rotor of motor 231 clockwise to create slack in apron 226. It may be noted that the oil in the spaces 234a, 234b, 234c and 234d serves to hydraulically balance the rotor 234 and thereby avoid the disadvantages of an unbalanced thrust against the bearings of the rotor.

In the operation of my machine, oil under pressure from master valve 36 enters the lower end of a cylinder 243 (Fig. 8) through pipe 36b, thereby raising a piston (not shown) in cylinder 243 and lifting piston rod 228 with bar 227, tubes 222 and platform 225 to the position shown in Fig. 8C. The portion of apron 226 overlying platform 225 is thereby lifted sufficiently to support the tobacco column in magazine 121 when the knife 123 (Fig. 7) is withdrawn from the bottom of the column. The oil flow is then reversed by master valve 36, causing oil to flow into the top of cylinder 243 through pipe 36a; and the portion of apron 226 supported on platform 225 is lowered with the tobacco column supported thereon after severance of a bunch charge from the bottom of the column by the knife 123 (Fig. 7).

At the same time, oil from master valve 44 enters the top of cylinder 244 through pipe 44a causing a piston (not shown) in the cylinder to move the piston rod 244a connected to a bar 244b downwardly. Roller 217a, which is mounted on arm 217, engages with a transverse slot in the upper end of bar 244b (Fig. 8) whereby both links 214 and 215 will be pulled down when piston rod 244a is displaced downwardly as indicated by the arrows on link 214 and bar 244b in Fig. 8C. Links 214 and 215, as previously mentioned, are pivoted on the portions of shaft 213 protruding from bracket 212 and carry the shaft 216a on which the two arms 217 and 218 attached to rider plate 219, as well as rolling pin 216, are mounted. The slot in bar 244b is wide enough to allow roller 217a to swing over the top of shaft 216a while the end of said shaft projecting from link 214 is also in the slot. When bar 244b moves down the top of the slot engages roller 217a attached to arm 217 which was previously described as being mounted on shaft 216a pivoted in link 214 which in turn is pivoted on shaft 213. The shaft 216a will therefore be moved downwardly in an arc concentric with shaft 213. Roller 245 attached to arm 218 being guided by a cam track in the stationary cam plate 246, causes roller 217a to pass over the top of shaft 216a due to the arc described by shaft 216a (see arrow on link 14 in Fig. 8C). On the upward stroke of bar 244b indicated by the arrow thereon in Fig. 8D the bottom of the slot engages shaft 216a. This upward movement causes roller 245 (which is now at the bottom of the cam 246) to be forced to the right carrying the rider plate 219 attached to arm 217 to the position shown in Fig. 8D and then to the position shown in Fig. 8E. Therefore the inner end of rider plate 219 will form a loop in the rolling apron 226 in front of platform 225. While rider plate 219 is forming the loop in the apron, the apron is paid out from roller 230 by the operation of motor 231, as previously described, to provide sufficient slack for the formation of the loop. This motion, together with that of the cam roller 245 supported from bracket 218 and moving in the track of the stationary cam plate 246, causes brackets 217 and 218 to turn on shaft 216a until rider plate 219 rests on top of the severed bunch charge which is lowered on apron 226 when the platform 225 descends as indicated by the arrow on tube 222 in Fig. 8C.

The bunch charge is now ready to be rolled into the binder B that has been deposited on the perforated portion of apron 226 provided with holes 226a overlying cover plate 263 as will be more fully described later. The binder so deposited will be suctionally retained thereon by the suction maintained in chamber 202.

Oil from master valve 35, through pipe 35b, enters valve block 247 (to be more fully described later) and then passes out through pipe 35c at the top of block 247 into a cylinder 248 (Fig. 8), thereby forcing piston 249 to the right with its piston rod 209. Piston rod 209 displaces the U-shaped bracket 208 to the right and causes gears 206 and 207 to be turned clockwise by racks 204 and 205 and to displace racks 210 and 211 to the right. Thus the rolling pin 216 and rider plate assembly, which is designated by the reference character P and mounted on bracket 212 as previously described, will move to the right with racks 210 and 211.

During the forward movement of bracket 212 the bunch charge will be coiled upon itself within the loop of the apron while the rider plate 219 holds down the portion of the charge in front of the rolling pin 216. During the rolling of the bunch charge upon itself the roller 245 will be guided in the lower horizontal section of the track in cam plate 246. The rider plate will thereby be maintained in a horizontal position until it reaches the upwardly extending section of the track in cam plate 246 shown in Fig. 8F and is then swung upwardly to the position shown in Fig. 8G while roller 245 passes through this upwardly extending section of the track in cam plate 246. Upon leaving the upper end of this section of track 246 roller 245 enters a recess 246a in the upper horizontal section of track 246 and engages a spring-pressed finger 246b. As the roller 245 rides over member 246b during its continued forward movement, plate 219 is swung rearwardly to a horizontal position. Plate 219 remains in the rearwardly extending horizontal position shown in dotted lines in Fig. 8G during the continued forward movement of the rolling pin 216 while the coiled bunch charge is rolled within the binder previously laid on apron 226 so to form a cigar bunch. The cigar bunch so formed is deposited into fingers 250 and 250a, which will be hereinafter described, when slack is removed from the apron by motor 231.

The reversal of oil flow by master valve 35, through pipe 35d, to the right side of cylinder 248 then returns the rider plate and rolling pin to the left in position for the next cycle. During the return movement of the rolling pin the roller 245 will re-engage the finger 246b and be guided into and along the upper horizontal portion of track 246 until the roller 217a enters the transverse groove of bar 244b.

Valve block 247 is a flow control valve, whereas the rate of flow on all other units is predetermined by the sizes of the orifices through which the fluid flows, as the load on said other units is constant. The load on rolling pin 216 varies if the machine is run without filler in the machine and also if different sizes of cigar bunches are made. It is, therefore, necessary to have a power demand control to apply a minimum force to the bunch rolling pin when there is no cigar bunch on the rolling apron and to vary the force applied in accordance with different sizes of cigar bunches. For this purpose valve block 247 may have the following construction:

Referring to Figs. 8 and 10, when master valve 35 is opened oil flows in from pipe 35b through a port 251 into an annular groove 253a formed in a sleeve 253, which is slidably mounted in a bore provided in block 247, through drilled holes 253b and past the conical portion of a valve plunger 252, which is slidably mounted in sleeve 253 and held open slightly by stop 254. The oil thus enters the interior of sleeve 253 and flows out through slots (not shown) in the outer end of sleeve 253, into port 255 formed in block 247 and thence through pipe 35c into the cylinder 248 where it builds up sufficient pressure to move piston 249. This pressure reacts back as far as valve plunger 252 and urges it against the resistance of a reactance spring 256 located within plunger 256 and seated against adjusting screw 257. Thus valve plunger 252 opens more or less in accordance with the different pressures required to displace piston 249 due to variations in the load on the rolling pin, and the oil will flow with more or less resistance into cylinder 248 as determined by the load on piston 249. Adjusting screw 257 is provided for the purpose of adjusting the required speed of piston 249 and is sealed against leakage by nut 258. At this time the inner end of the sleeve 253 engages the inner face of nut 258, and the oil displaced from cylinder 248 flows through pipe 35d and thence through ports formed in block 247 and communicating with axially extending slots (not shown) in the inner end of sleeve 253 whereby the oil is returned through pipe 35a to valve 35.

When oil flow is reversed by master valve 35 to permit the oil to flow through pipe 35a and ports formed in cylinder 247 and communicating with pipes 35a and 35d respectively, sleeve 253 is forced to the left by the pressure of the fluid flowing from pipe 35a to pipe 35d, allowing maximum flow through port 255 into port 251 of the fluid displaced from cylinder 248 through pipe 35c. The outer end of sleeve 253 now engages the base portion 254a of stop 254 and the oil returned through pipe 35c flows from port 255 through the slots S in the outer end of sleeve 253 into the interior thereof and thence past a conical portion of valve 252 into the radial holes 253b, the circumferential slot 253a and thence out to port 251 to be returned through the pipe 35b to valve 35.

Latch 259 is pivoted on bracket 212 and maintained by a compression spring 259a in a position overlying a step formed on the rear end of link 214 to prevent downward movement of links 214 and 215. Latch 259 is unlocked by engagement with a stationary cam piece 260 when bracket 212 is at the extreme left position to permit the bar 244b, when piston rod 244a is moved downwardly, to lower the roller 217a and thereby swing arms 214 and 215 downwardly as described above. After arm 214 is swung upwardly into horizontal position by the coaction of the transverse slot in bar 244b with the shaft 216a, as shown in Figs. 8D and 8E, the step at the rear end of arm 214 will be engaged by the latch 259 when the latter is locked upon disengaging cam piece 260 during the forward movement of bracket 212. In this manner the arms 214 and 215 are maintained in a horizontal position while the rolling pin moves to the end of its forward stroke and then returns to its initial position.

Certain safety devices are incorporated in the bunch rolling table. For example, in case bracket 212 fails to return to its initial position wherein latch 259 engages block 260 the following will occur. The bracket 212, it should be said, might fail to return in case an unduly large bunch charge was deposited on the rolling apron which might cause the rider plate to jam and thereby stop the movement of the rolling pin; but the corrugated cutter 133 and the knife 123 would continue to operate and might cause further jamming.

To obviate the same there is provided a lever 265 secured to a vertical shaft 267 suitably supported in the table L of the machine. To the lower end of shaft 267 is fastened an arm 269 which is provided with a lug 270. A spring 272 connected to lever 265 and anchored on a post 274 on table L is adapted to move arm 269 into a position wherein its lug 270 underlies the cam lever 32L of the master valve 32 when the rolling pin reaches the end of its forward stroke across the rolling table. A link 276 connects arm 269 to an arm 278 provided with a lug 279 and mounted on a vertical shaft supported in the bed of the machine. Thus, when lug 270 of arm 269 is moved underneath cam lever 32L, lug 279 of arm 278 will be moved underneath cam lever 37L of master valve 37. Thus, whenever stop screw 281 threaded into a block secured to rack 210 fails to return to the position shown in Fig. 8 wherein it engages a post 283 on arm 265, the lugs 270 and 279 will remain underneath the cam levers 32L and 37L and the operation of the corrugated cutter 133, pressure plate 144 and knife 123 will be stopped. If the stop-screw 281 is returned to this position it will displace the lever 269 sufficiently to move lugs 270 and 279 from underneath cam levers 32L and 37L and permit the operation of the cutter 133 and knife 123 to continue. Since the knife 123 is stopped at its innermost position, the tobacco column in the magazine 121 will be supported on the knife 123. Moreover the operation of the cross-feed will also be interrupted until the operation of cutter 133 is resumed.

On shaft 214 (Figs. 8C, 8D, 8E, 8F and 8G) there may be provided a torsion spring 214a which is anchored at one end to the bracket 212 and connected at its other end to the link 214. The torsion spring serves to maintain the arm 214 in a horizontal position except when lowered by bar 244b. Therefore if the latch 259 should be accidentally disengaged from the step on the rear end of arm 214 the arms 214 and 215 will not swing downwardly.

Due to my improved mechanism for operating the rider plate to form the loop in the apron it is possible to separate the bunch charge while the lower end of the tobacco column is supported on the apron, without providing excessive space beneath the lower end of the column for swinging the rider plate forwardly on to the separated bunch charge. Moreover no additional mechanism for forming the loop in the apron is required, as in prior constructions wherein the bunch charge is displaced horizontally along the rolling apron to a position at which the loop is formed at one side of the charge.

A further advantage of the construction of the hydraulic motor 231 for operating the take-up roller 230 of the bunch rolling apron is that the elaborate mechanism now used for tightening the bunch rolling apron to expel the cigar bunch from the loop in the apron is dispensed with. When the cigar bunch is formed in the loop of the apron and advanced therein to a position overlying the fingers 250 and 250a, the slack is removed from the bunch rolling apron by the counter-clockwise rotation of the rotor 234 of motor 231 and the bunch is expelled from the loop into these fingers as the loop is straightened out by tightening the apron. Moreover the amount of slack provided in the apron for the formation of the loop therein is controlled by stops 232, 235 and 233, 236. Thus the amount of clockwise rotation of the take-up roller, when the slack is played out, is controlled.

In view of the foregoing it will be evident that with the embodiment of the hydraulically operated cigar machine exemplified herein I am able to reduce its cost and weight by elimination of such items as heavy and expensive cams, shafts, and driving connections. Moreover there is less danger of injury from moving parts of the machine.

What is claimed is:

1. In a cigar machine, the combination with a horizontal knife underlying and supporting the lower end of a vertical column of long filler tobacco, of a bunch rolling apron having a portion underlying the portion of said knife supporting the tobacco column, means for operating said knife to retract it whereby the column will be deposited on the apron and the knife moved across the lower end of said column after it is deposited on said apron, to separate a bunch charge therefrom, a rolling pin having an axial shaft arranged beneath said apron and extending transversely thereof behind the bunch charge supported thereon and adapted to advance a loop in the apron to roll the bunch charge in a binder to form a cigar bunch, a rider plate pivotally mounted on the axial shaft of said rolling pin, and instrumentalities supporting said rolling pin and constructed and arranged to swing the rolling pin in a downward arc with the rider plate to cause the rider plate to form a loop in the apron and then to swing the rider plate up and forwardly into a position resting on the bunch charge supported on the rolling apron to cause the charge to be coiled upon itself when said loop is advanced by the rolling pin.

2. In a cigar machine, the combination with a bunch rolling apron adapted to support a cigar bunch charge upon a portion thereof, a rolling pin arranged beneath said apron and extending transversely thereof behind said bunch charge, a rider plate pivoted co-axial to said rolling pin and having its inner edge extending across the portion of said apron between said rolling pin and bunch charge, and mechanism supporting said rolling pin and constructed and arranged to swing said rolling pin in a downward arc with said rider plate to form a loop in the apron and then to swing said rider plate forwardly into a position resting on said bunch charge.

3. In a cigar machine, the combination with a bunch rolling apron adapted to support a cigar bunch charge upon a portion thereof, a rolling pin adapted to be arranged beneath said apron and extending transversely thereof behind said bunch charge, a rider plate pivotally mounted co-axial to said rolling pin and having its inner edge extending across the portion of said apron between said rolling pin and bunch charge, mechanism for moving said rolling pin vertically with said rider plate to form a loop in the apron and then swing said rider plate forwardly into a position resting on said bunch charge, said mechanism including a horizontally movable support, a pair of horizontal arms pivoted on support, a shaft mounted in said arms, said rolling pin and rider plate being mounted on said shaft, and instrumentalities for lowering said arms to cause the formation of the loop in the apron by said rider plate.

4. In a cigar machine, the combination with a bunch rolling apron adapted to support a cigar bunch charge upon a portion thereof, a rolling pin adapted to be arranged beneath said apron and extending transversely thereof behind said bunch charge, a rider plate pivoted co-axial to said rolling pin and having its inner edge extending across the portion of said apron between said rolling pin and bunch charge, mechanism for moving said rolling pin vertically with said rider plate to form a loop in the apron and then swing said rider plate forwardly into a position resting on said bunch charge, said mechanism including a horizontally movable support, a pair of horizontal arms pivoted on said support, a shaft mounted in said arms, said rolling pin and rider plate being mounted on said shaft, instrumentalities for lowering said arms to cause the formation of the loop in the apron by said rider plate, and then raising said arms to a horizontal position, and a latch adapted to retain said arms in a horizontal position after they are raised by said instrumentalities.

5. In a cigar machine, the combination with a bunch rolling apron adapted to support a cigar bunch charge upon a portion thereof, a rolling pin adapted to be arranged beneath said apron and extending transversely thereof behind said bunch charge, a rider plate pivotally mounted in axial alignment with said rolling pin and having its inner edge extending across the portion of said apron between said rolling pin and bunch charge, mechanism for moving said rolling pin vertically with said rider plate to form a loop in the apron and then swing said rider plate forwardly into a position resting on said bunch charge, said mechanism including a horizontally movable support, a pair of horizontal arms pivoted on said support, a shaft mounted in said arms, said rolling pin and rider plate being mounted on said shaft, instrumentalities for lowering said arms to cause the formation of the loop in the apron by said rider plate, and then raising said arms to a horizontal position, a latch adapted to retain said arms in a horizontal position after they are raised by said instrumentalities, means for moving said rolling pin forwardly to traverse said loop forwardly along the apron while the bunch charge is held down by the rider plate and thereby coil the charge upon itself within said loop and then roll the coiled charge within a binder positioned on the apron to form a cigar bunch, and a device for swinging said rider plate upwardly after the bunch charge is coiled upon itself and before the coiled bunch charge is rolled within the binder.

6. In a cigar machine, the combination with a bunch rolling apron, of means for forming a loop in said apron, a bunch rolling pin extending transversely of and underneath said apron and adapted to advance the loop in said apron with a bunch charge positioned in said loop, and means for advancing said rolling pin to advance the loop in the apron and thereby advance the bunch charge positioned therein and roll it within a binder positioned on said apron, said means including a two-way hydraulic control valve for automatically varying the force imparted to the rolling pin to advance the same in conformity with the resistance of the bunch charge being advanced within the loop of the apron to be rolled within a binder.

7. In a cigar machine having a bunch rolling apron, means for forming a loop in said apron, and a bunch rolling pin extending transversely of and underneath said apron and adapted to advance the loop in said apron with a bunch charge positioned in said loop, the means for advancing said rolling pin to advance the loop in the apron and thereby advance the bunch charge positioned therein and roll it within a binder positioned on said apron and to return said rolling pin, said means including mechanism for automatically varying the force imparted to the rolling pin to advance the same in conformity with the resistance of the bunch charge being advanced within the loop of the apron to be rolled within a binder, said mechanism including a cylinder, a piston slidably mounted in said cylinder and connected to said rolling pin, and a device for supplying fluid under pressure to said cylinder to displace said piston in either direction, said device including instrumentalities for automatically controlling the pressure of the fluid supplied to said cylinder during its advance in one direction in accordance with the resistance of a bunch being advanced within the apron loop for rolling within a binder.

8. In a cigar machine having a bunch rolling table and a bunch rolling apron on said table, the apron being secured to the table at one end; a take-up roller to which the other end of the apron is secured, means to provide constant torque to said take-up roller, said means comprising an hydraulic motor connected to said roller and adapted to turn said roller in one direction to provide sufficient slack in the apron for the formation of a loop therein, and subsequently turn the roller in the opposite direction to tighten and remove the loop from the apron, and means for controlling the supply of fluid under pressure to said motor to turn it in one direction to slacken the apron to permit formation of a loop in the apron and then in the opposite direction to tighten the apron to a predetermined tension and remove the loop therefrom.

9. In a cigar machine having a bunch rolling table and a bunch rolling apron on said table, the apron being secured to the table at one end; a take-up roller to which the other end of the apron is secured, means to provide constant torque to said take-up roller, said means comprising an hydraulic motor connected to said roller and adapted to turn said roller in one direction to provide sufficient slack in the apron for the formation of a loop therein, and subsequently turn the roller in the opposite direction to tighten and remove the loop from the apron, and means for supplying fluid under pressure to said motor to turn it in one direction to slacken the apron to permit formation of a loop in the apron and then in the opposite direction to tighten the apron and remove the loop therefrom, said hydraulic motor having a housing provided with a concentric bore, a rotor mounted in said bore, plugs secured in said rotor in diametrically opposite positions, stops secured in said housing in diametrically opposite positions to engage said plugs and thereby limit the rotation of said rotor, a pair of openings formed in said housing at either side of one of said stops and communicating with said concentric bore, an elongated bore in said housing communicating with said openings, an inlet port and an outlet port communicating with said bore, a valve slidably mounted in said elongated bore, and a spring yieldingly holding said valve against one end of said bore to permit fluid under pressure to flow from said inlet port past said valve and through one of said openings into the concentric bore to turn said rotor counter-clockwise and thereby remove slack from the rolling apron and cause fluid to flow from said concentric bore past said valve and into the outlet port, said valve having a hole extending from the inlet port to the end of the valve which is held against the end of the elongated bore by said spring whereby fluid will flow through said hole and displace said valve against the resistance of said spring to close said inlet port and stop the counter-clockwise rotation of said rotor, whereby fluid supplied under pressure to said outlet port will cause clockwise rotation of said rotor to provide slack in the apron.

10. In a cigar machine, the combination with means for assembling a section of long filler tobacco to form a vertical column of tobacco, a horizontal knife underlying and supporting the lower end of said column, a bunch rolling table having a section underlying a portion of said knife and supporting a tobacco column, a movably mounted suction chamber positioned beneath the section of said apron underlying said tobacco column, means for operating said knife to retract it whereby the column will be deposited on the apron and over said movable suction chamber, means to apply suction to said suction chamber to suctionally hold said apron on said suction chamber, said knife operating means then moving the knife across the lower end of said column after it is deposited on said apron to separate a bunch charge therefrom, and an hydraulic mechanism for raising said suction chamber and said apron in to position to support the tobacco column when the knife is retracted, said mechanism including a mechanical stop being adjustable to vary the uppermost position of the suction chamber underlying said apron whereby the thickness of the bunch charge supported by the knife will be varied.

11. In a cigar machine having a horizontal knife underlying and supporting the lower end of a vertical column of long filler tobacco, a bunch rolling apron having a section underlying the portion of said knife supporting the tobacco column, and means for operating said knife to retract it whereby the column will be deposited on the apron and then move the knife across the lower end of said column after it is deposited on said apron to separate a measured bunch charge of predetermined height therefrom, a suction chamber movably mounted to engage an under portion of said section of said apron underlying the tobacco column, and hydraulic means for raising said suction chamber and said apron to a selected height to support the tobacco column when the knife is retracted, then lowering the suction chamber with the apron suctionally held thereto and said bunch charge supported thereon.

12. The combination with a movable member adapted to be moved forwardly to perform an operation, of a hydraulic cylinder, a piston slidably mounted in said cylinder and connected to said member to move it forwardly when said piston is moved forwardly in said cylinder, and means for supplying liquid under pressure to said cylinder to displace said piston forwardly in said cylinder and thereby move said member forwardly and then to displace said piston backwardly under pressure to return said member to its initial position, said means including a sleeve having an orifice through which the liquid passes, and a member in said sleeve operative to vary the size of said orifice to automatically regulate the volume of liquid supplied to said cylinder to displace said member forwardly at the same speed regardless of variations in pressure due to the resistance encountered by said movable member while moving forwardly to perform an operation, and said sleeve being movable relative to said member to maintain said orifice fully open during the return stroke of said piston in said cylinder.

13. The combination with a movable member adapted to be moved forwardly to perform an operation, of a hydraulic cylinder, a piston slidably mounted in said cylinder and connected to said member to move it forwardly when said piston is moved forwardly in said cylinder, and means for supplying liquid under pressure to said cylinder to displace said piston forwardly and backwardly in said cylinder and thereby move said member to and fro, said means comprising a sleeve, and a second piston in said sleeve, said sleeve having an orifice in the wall thereof through which said liquid passes, said second-named piston being positioned to pass across said orifice and being operative to regulate the size of said orifice in response to back pressure from said first-named piston during its forward stroke, said second-named piston moving in response to said back pressure to automatically regulate the volume of liquid supplied to said cylinder to displace said first-named piston forwardly at the same speed regardless of variations in the resistance encountered by said moving piston while moving forwardly to perform an operation, said sleeve being movable to a position whereat said second-named piston may not act across said orifice in said sleeve when said first-named piston is moved backwardly in said cylinder and said liquid will move backwardly through said device while said orifice is unrestricted during the backward stroke of said first-named piston.

14. In a cigar machine, the combination with a bunch rolling apron adapted to support a cigar bunch charge upon a portion thereof, a rolling pin adapted to be arranged beneath said apron and extending transversely thereof behind said bunch charge, a member supported adjacent said rolling pin, said apron extending between said rolling pin and member, and means supporting said rolling pin constructed and arranged to lower said rolling pin with said member in an arc whereby said member will form a loop in said apron in front of the bunch charge.

15. In a cigar machine, the combination with a bunch rolling apron adapted to support a cigar bunch charge upon a portion thereof, a rolling pin adapted to be arranged beneath said apron and extending transversely thereof behind said bunch charge, a member supported adjacent said rolling pin, said apron extending between said rolling pin and member, means supporting said rolling pin and constructed and arranged to lower said rolling pin with said member in an arc whereby said member will form a loop in said apron in front of the bunch charge, mechanism to drive said rolling pin to and fro along the apron to cause the bunch charge to be advanced within the loop of the apron and rolled within a binder deposited on the apron, said means operative to raise said rolling pin after the formation of the loop in the rolling pin, and a device to hold said rolling pin in its raised position while it is advanced along the apron.

HENRY H. WHEELER.

References Cited in the file of this patent

UNITED STATES PATENTS

| Number | Name | Date |
|---|---|---|
| 328,774 | Gordon | Oct. 20, 1885 |
| 430,644 | Hammerstein | June 24, 1890 |
| 519,436 | Schweim | May 8, 1894 |
| 1,191,592 | Hansen | July 18, 1916 |
| 1,252,934 | Norquest | Jan. 8, 1918 |
| 1,469,006 | Lewis | Sept. 25, 1923 |
| 1,578,579 | Bronander | Mar. 30, 1926 |
| 1,786,608 | Halstead | Dec. 30, 1930 |
| 1,888,788 | Clausen | Nov. 22, 1932 |
| 1,909,813 | Crosbie | May 16, 1933 |
| 1,916,017 | Rundell | June 27, 1933 |
| 2,012,149 | Wheeler | Aug. 20, 1935 |
| 2,139,185 | Engel | Dec. 6, 1938 |
| 2,148,897 | Bonn | Feb. 28, 1939 |
| 2,151,898 | Clausen | Mar. 28, 1939 |
| 2,158,315 | Wheeler | May 16, 1939 |
| 2,164,876 | Horlacher | July 4, 1939 |
| 2,172,834 | Clausen | Sept. 12, 1939 |
| 2,206,163 | Clench | July 2, 1940 |
| 2,213,244 | Finn | Sept. 3, 1940 |
| 2,277,732 | Wahlstrom | Mar. 31, 1942 |
| 2,292,361 | Carlson | Aug. 11, 1942 |
| 2,311,011 | Wheeler | Feb. 16, 1943 |
| 2,316,828 | Wheeler | Apr. 20, 1943 |
| 2,324,509 | Jorgensen | July 20, 1943 |
| 2,328,979 | Herman et al. | Sept. 7, 1943 |
| 2,331,905 | Halstead | Oct. 19, 1943 |
| 2,333,675 | Randolph | Nov. 9, 1943 |
| 2,343,902 | Halstead | Mar. 14, 1944 |
| 2,356,637 | Wheeler | Aug. 22, 1944 |
| 2,363,142 | Reed | Nov. 21, 1944 |
| 2,366,121 | Burst | Dec. 26, 1944 |
| 2,378,166 | Wheeler | June 12, 1945 |
| 2,416,373 | Brown | Feb. 25, 1947 |
| 2,470,766 | Durning | May 24, 1949 |

FOREIGN PATENTS

| Number | Country | Date |
|---|---|---|
| 489,791 | Great Britain | Aug. 4, 1938 |